(12) United States Patent
Dumuk et al.

(10) Patent No.: US 10,471,626 B1
(45) Date of Patent: Nov. 12, 2019

(54) NICKEL BISCUIT JOINER

(71) Applicants: Gerard Dumuk, Hayward, CA (US); Rachel McConnell, Hayward, CA (US)

(72) Inventors: Gerard Dumuk, Hayward, CA (US); Rachel McConnell, Hayward, CA (US)

( * ) Notice: Subject to any disclaimer, the term of this patent is extended or adjusted under 35 U.S.C. 154(b) by 0 days.

(21) Appl. No.: 16/101,523

(22) Filed: Aug. 13, 2018

(51) Int. Cl.
*B27M 3/18* (2006.01)
*A47B 13/00* (2006.01)
*A47B 13/04* (2006.01)
*B27F 5/02* (2006.01)
*E04F 15/02* (2006.01)

(52) U.S. Cl.
CPC .............. *B27M 3/18* (2013.01); *A47B 13/003* (2013.01); *A47B 13/04* (2013.01); *B27F 5/02* (2013.01); *B27F 5/023* (2013.01); *E04F 2015/02094* (2013.01); *E04F 2201/05* (2013.01); *F16B 2200/30* (2018.08)

(58) Field of Classification Search
CPC ........ E04F 2201/05; E04F 2015/02094; B27F 5/02; B27F 5/023; F16B 2200/30; Y10T 29/49947
USPC ........ 144/353; 403/286, 292, 293, 244, 252, 403/263; 230/244, 252, 263
See application file for complete search history.

(56) References Cited

U.S. PATENT DOCUMENTS

| | | | | |
|---|---|---|---|---|
| 639,781 A | * | 12/1899 | Sleeth | B25G 3/02 403/253 |
| 4,117,784 A | * | 10/1978 | Piretti | A47B 3/06 108/150 |
| 4,689,929 A | * | 9/1987 | Wright | E04B 2/7425 52/239 |
| 4,942,912 A | * | 7/1990 | Gakhar | B23Q 9/0028 144/136.1 |
| 5,251,996 A | * | 10/1993 | Hiller | F16B 12/10 403/292 |
| 5,458,433 A | * | 10/1995 | Stastny | B27F 5/02 144/136.95 |
| 5,730,544 A | * | 3/1998 | Dils | F16B 12/04 403/13 |

(Continued)

FOREIGN PATENT DOCUMENTS

GB 2435287 A * 8/2007 ............... E05D 5/04

*Primary Examiner* — Jason L Vaughan
(74) *Attorney, Agent, or Firm* — Richard Bennett Salles

(57) ABSTRACT

The invention is a unique modification of biscuit joinery. The instant invention creates "two way" slots in joining wood [preferred embodiment] pieces, allowing a "shelf joint" in the center of a face of wood, to be fastened with a common nickel (or similar coin or disc). Rather than using a limited biscuit cutter/biscuit joiner, the instant method discloses use of a router with a specialized router bit (aka slot cutter bit); the slot cutter on the router [when the bit is machined in the following way infra, and then configured and used in the following way infra] allows a common 5¢ piece to become the spline joining the two wood pieces or panels, thereby allowing rapid assembly & disassembly of wood furniture. The precise ratios and proportions of grooves, slots, coin wells, overhangs, pushtool 'raceways,' and offsets therefor, make this invention possible. Specifically, by featuring a "raceway overhang" of height-thickness at least 10% that of the "female" piece of joining wood, the herein-disclosed disc-biscuit joiner method and apparatus holds.

14 Claims, 12 Drawing Sheets

(56) References Cited

U.S. PATENT DOCUMENTS

| | | | | |
|---|---|---|---|---|
| 6,402,415 | B1* | 6/2002 | Eberle, III | E04F 13/0846 |
| | | | | 403/231 |
| 2003/0175071 | A1* | 9/2003 | Layfield | F16B 5/0012 |
| | | | | 403/292 |
| 2004/0020152 | A1* | 2/2004 | Harris, Sr. | E04B 5/12 |
| | | | | 52/582.1 |
| 2004/0060255 | A1* | 4/2004 | Knauseder | E04F 13/10 |
| | | | | 52/582.2 |
| 2004/0182034 | A1* | 9/2004 | Eberle, III | E04F 15/04 |
| | | | | 52/586.1 |
| 2004/0184878 | A1* | 9/2004 | Eberle, III | E04F 15/04 |
| | | | | 403/408.1 |
| 2004/0189160 | A1* | 9/2004 | Wells | A47B 47/042 |
| | | | | 312/263 |
| 2006/0283122 | A1* | 12/2006 | Burgess | E04B 5/12 |
| | | | | 52/480 |
| 2014/0144092 | A1* | 5/2014 | Benz | E04F 15/02016 |
| | | | | 52/384 |
| 2014/0186109 | A1* | 7/2014 | Wadsworth | E04F 15/02 |
| | | | | 403/404 |

* cited by examiner

NICKEL BISCUIT JOINER

CROSS-REFERENCE TO RELATED APPLICATIONS

This application claims priority to no U.S. Provisional Applications.

FIELD OF THE DISCLOSURE

The disclosure relates to the fields of carpentry methods, woodworking, plate-biscuit joinery, furniture fasteners and methods and tooling therefor.

BACKGROUND

This invention is a method for machining, configuring and using woodworking tools to produce wood furniture capable of being joined with nickels (U.S. 5¢ coin) as fasteners (as plates, or plate biscuits). The herein-disclosed method lies within the umbrella of plate joinery, as do the joints and furniture manufactured via the herein-disclosed method.

The market for the instant method (and for furniture so assembled) is universal; manufacturers save money on assembly kits comprising plates, and customers may assemble & disassemble furniture without keeping track of biscuits. The enclosed method allows for furniture assembly without cam fasteners, bolts or screws.

Historically, joining wood parts/panels is often accomplished via cam bolts and pins. "Mortise and tenon" joints are also used, as are glue (via clamping) or standard biscuit joiner methods. "Edge to face" jointing, aka shelf/housing jointing, is often accomplished via biscuit joinery, but biscuit joinery usually requires screws in conjunction with biscuits (internal plates inserted into slots) for stronger fastening. Often the plates/biscuits are dipped in glue before being inserted, or their moisture is predetermined to cause internal expansion (customarily enlarge upon pre-wetting).

Customarily, a "biscuit joiner" [dedicated woodworking tool] is used to mill the slots for such plates, and said power tool is often fitted with a fence-attachment to keep the tool flush as it cuts. This tool is limiting, however, as the biscuits will usually be accessible only from the edge as "wedge-in" pieces, and the jointer only allows certain specified size/shape biscuits. In addition, unlike the present invention, biscuit slots milled by a biscuit joiner are usually wholly-concealed once assembled (once the biscuits are inserted into their slot mouth and the wood panels are then pressed together).

Traditionally, to mill slots for biscuits, a 2 mm (e.g.) biscuit joint slot cutter is used (customarily with a ¼" to 2" shank/shaft/neck). A router bit is used in such circumstances, chucked and positioned so it moves through a groove in the wood to mill an internal slot. Radial guide bearings allow precise depth stop.

Even when such a router is used with this pre-fabricated bit, the resulting assembly methods leave the biscuit hidden (jammed-in, once-assembled), requiring the furniture owner to permanently "pull apart" the wood pieces/panels in order to disassemble the furniture. Such disassembly is particularly difficult, as the biscuits are usually comprised of wood, and so expand to become inaccessible, or the biscuits pulverize upon removal.

Furniture owners therefore need a better method, on in which they can easily access the biscuits to pull them out to disassemble the wood furniture. Furthermore, both furniture sellers and consumers would prefer to use a "makeshift biscuit," a common item they already possess (something they need not keep track of).

Nickels (the common U.S. coin) make ideal makeshift biscuits, as coins are uncommonly durable, waterproof, non-expanding, non-conductive, and guaranteed to remain the mere price of a nickel.

Therefore, what is needed is a System (a specially tailored slot cutter used in a special way) that allows common nickels to function as fasteners to assemble wood furniture.

BRIEF DESCRIPTION OF THE DRAWINGS

FIG. 8 further illustrates the measurements and dimensions described throughout the instant Application, here the dimensions of various slots in the "male part/panel" which make the instant invention possible in the preferred embodiment.

FIG. 9 therefore illustrates the measurements and dimensions described throughout the instant Application, here the dimensions of various slots in the "female part/panel" which make the instant invention possible in the preferred embodiment.

DEFINITIONS

Push Tool Raceway: the push tool raceway is the thin slot along-&-through which the tool travels while pushing the nickel along the coin slot. The push tool may be any thin hard poker device such as a fork tine, tweezers, handle, hairpin, chopstick, straightened paper clip, needle, screwdriver, awl, or similar "tool," or even a fingernail.

Coin Well Raceway: the milled plane along which the coin (or biscuit) will move during assembly and disassembly, said raceway (space) being on the same plane as the push-tool raceway (and, in some parts, push-tool raceway and coin-well raceway are used interchangeably, as the push-tool and the coin often move together along the same plane during assembly and disassembly). The raceway is interchangeable with coin-well distance 816, and lies on the same plane.

Figure 8:
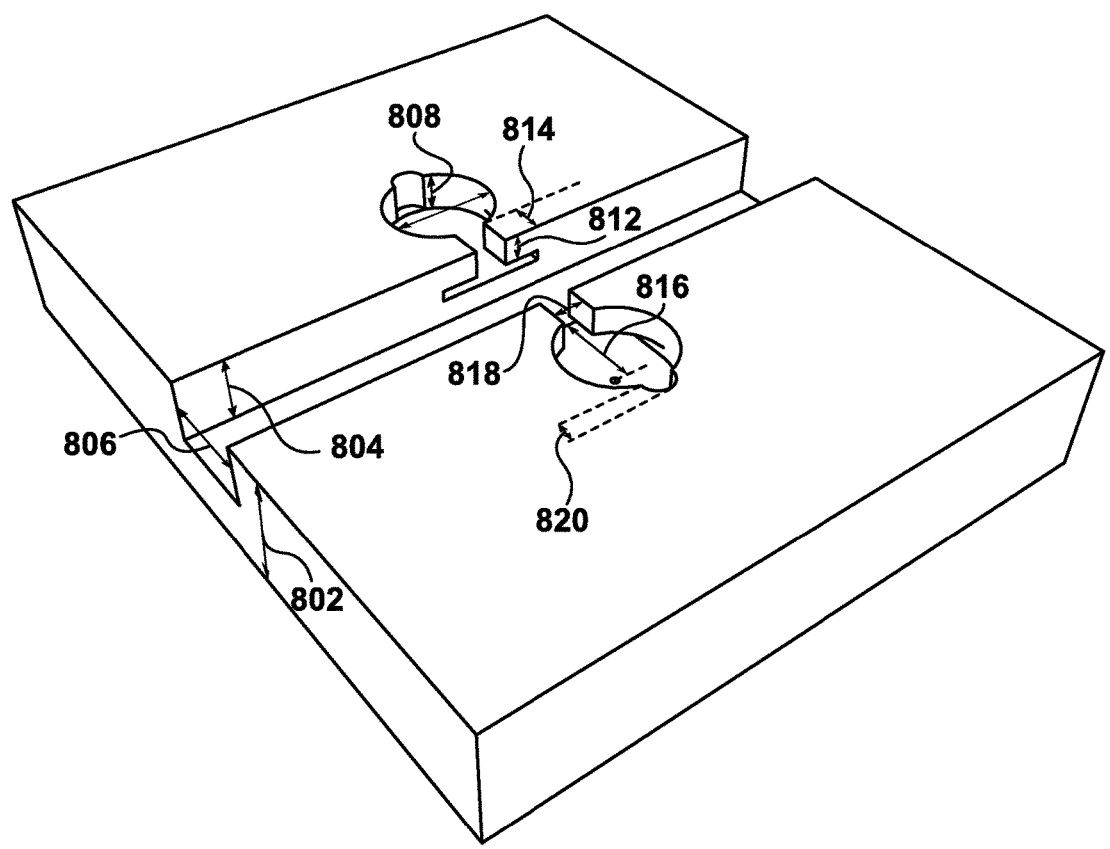
FIG. 8 is an elevational view of the female part, delineating the parameters, ratios and measurements that make this embodiment possible.
Figure 9:
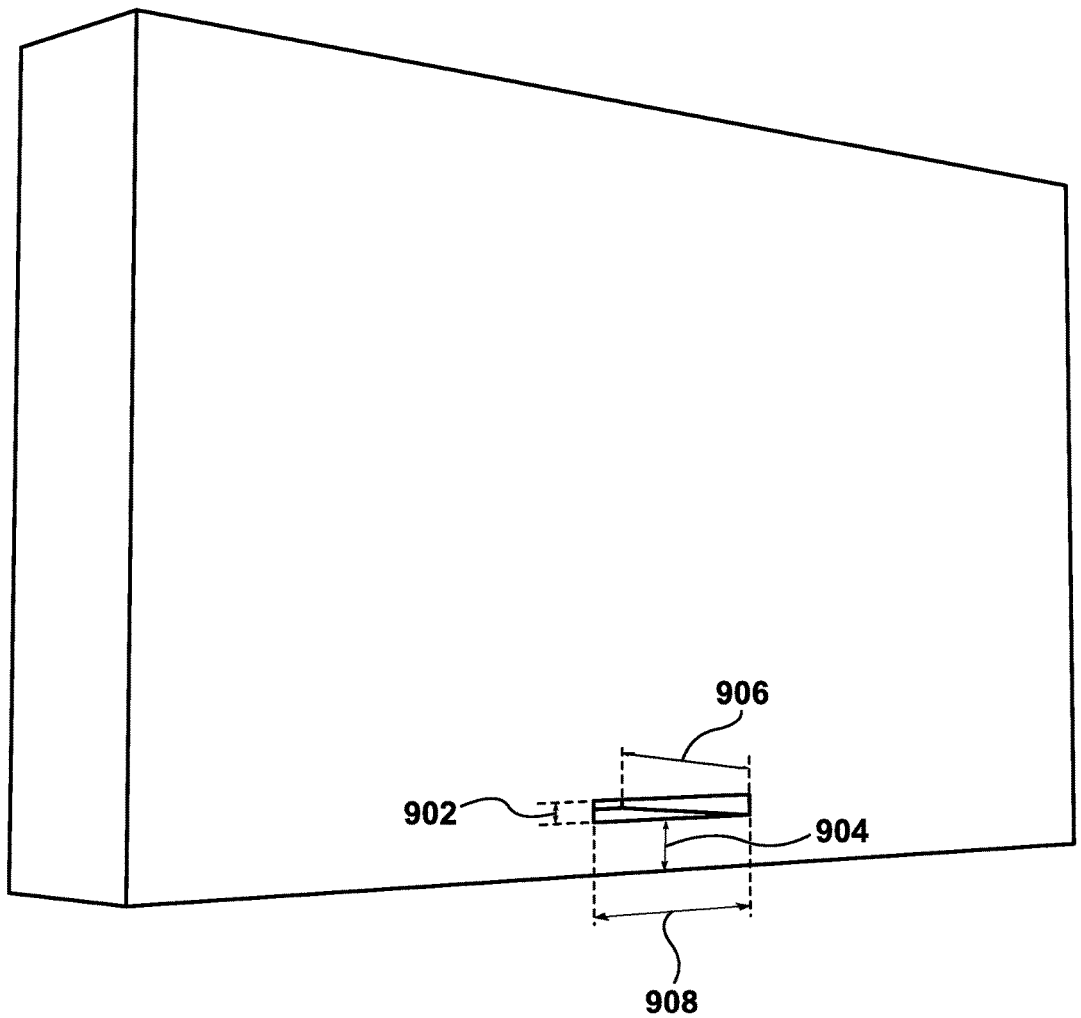
FIG. 9 is an elevational view of the male part, delineating the parameters, ratios and measurements that make this embodiment possible.

Female Part Thickness: thickness of material female part/panel (the wood-piece) is constructed from. This dimension is marked as 802 in FIG. 8.

Male Part Thickness: thickness of material male part/wood piece/panel is constructed from. This dimension is marked as 906, and must be longer than the nickel's diameter.

Tool Raceway Width 818: width of push tool raceway (must be at least the diameter of the modified Woodruff keyseat cutter's neck, and should be no bigger (or marginally/nominally larger width)). Raceway width 818 is the distance between the two cantilever overhang 814 ends.

Offset: additional parameter size/allowance to let the moving parts of the assembly pass by each other. Preferred embodiment, this measurement is +0.0075".

"No-Break Distance" 812: (also called raceway overhang distance): minimum thickness of material required so as not to break (so the furniture so assembled will not break) under normal use & ordinary stress. Specifically, the thickness of the wood just above the Nickel (the fastener) which will allow the joint (and the furniture held together by said joint) to tolerate the stress of its own weight and manipulation (when lifted)). This measurement will be particularly valuable when discussing the "overhang thickness" 812 infra & supra.

Minimum Overhang 814: length of the shortest part of the coin raceway overhang, at the edges of the push tool raceway, measured from the beginning of the central female part groove to the beginning of the coin-well. Must be at least the "no-break-distance" and should be about 30% of the coin's diameter.

Coin Well Depth: how deep the bottom of the coin-well (and raceways) are cut into the female part 808.

Coin Well (Full) Distance: distance from the edge of the male part groove to the center of the coin-well 816.

Figure 1A:
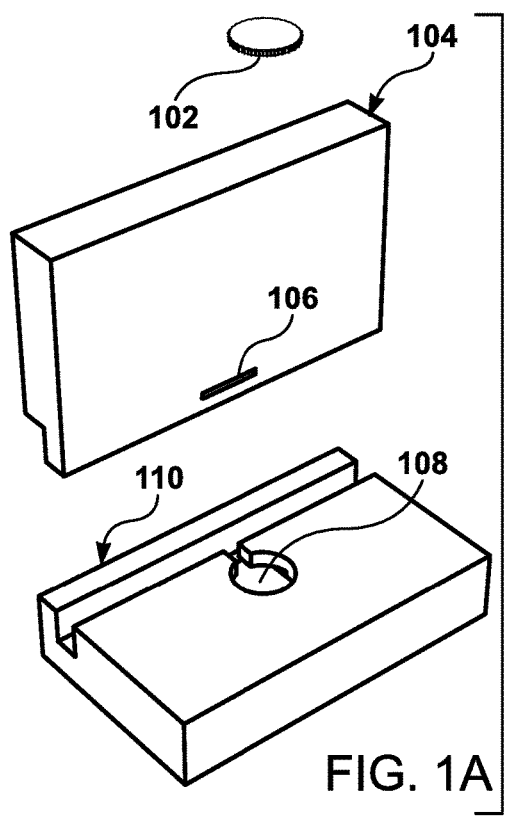
FIGS. 1A-1F are elevational views depicting the invention in various stages of assembly of one embodiment of the invention.
Figure 1B:
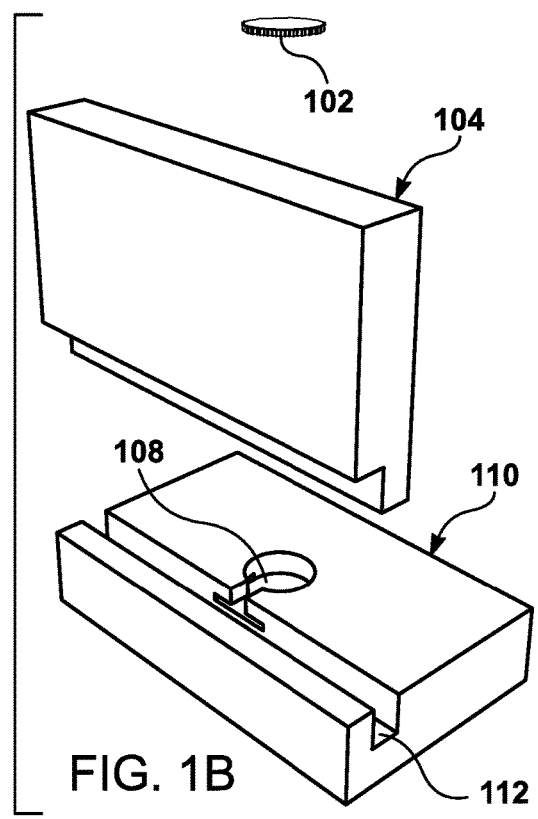
Figure 1C:
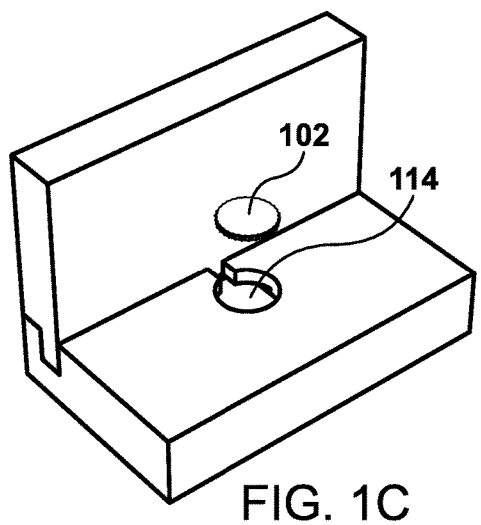
Figure 1D:
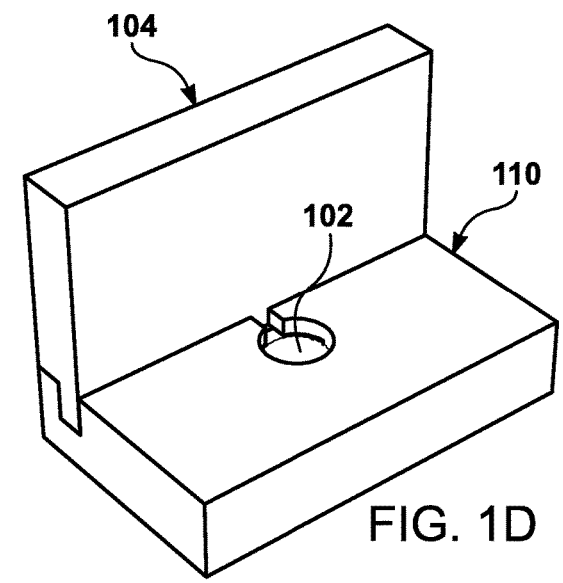
Figure 1E:
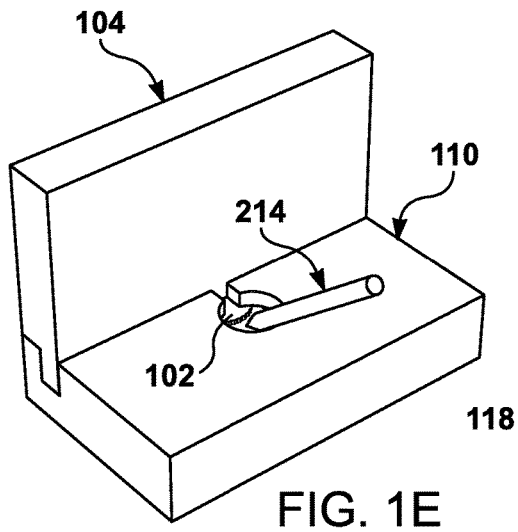
Figure 1F:
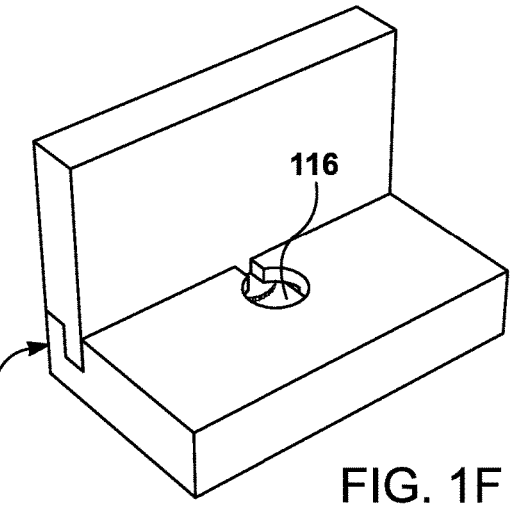
Figure 2A:
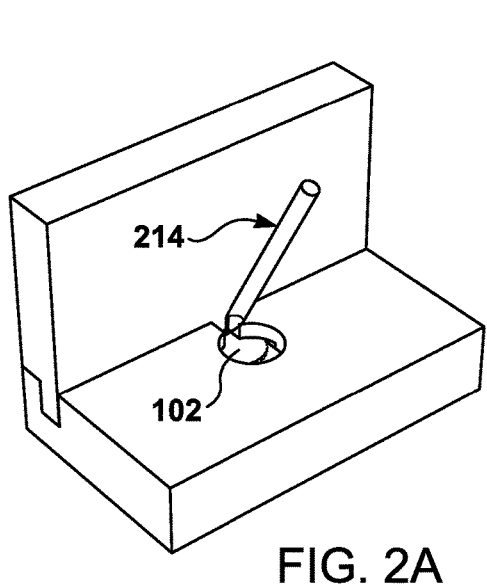
FIG. 2A is an elevational view of the invention; herein a tool pushing a coin from the coin well into the male part's slot to act as a fastener and complete the joint.
Figure 2B:
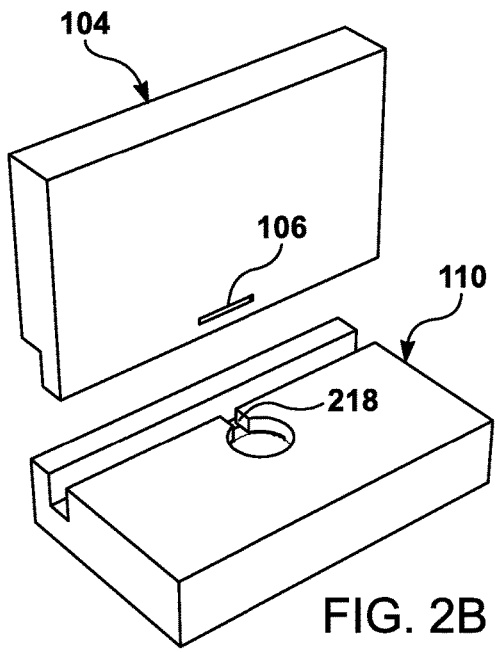
FIG. 2B is an elevational view of the invention in its disassembled state.
Figure 3A:
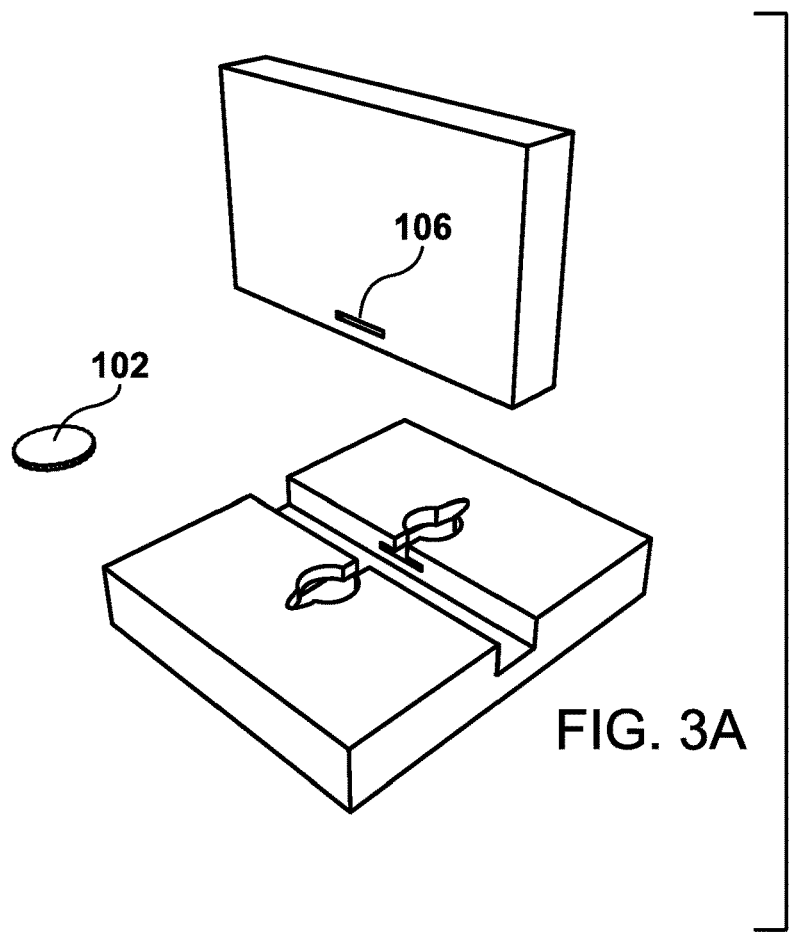
FIGS. 3A and 3B are perspective views showing the invention in its "before" state [FIG. 3A] and in its "after" state [FIG. 3B], respectively. Note the coin wells in these Figures have an added "notch" for easier tool-entry.
Figure 3B:
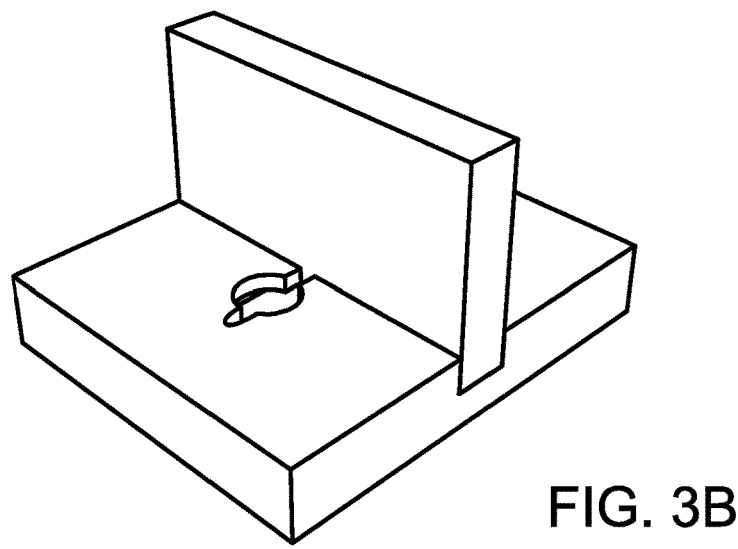
Figure 4A:
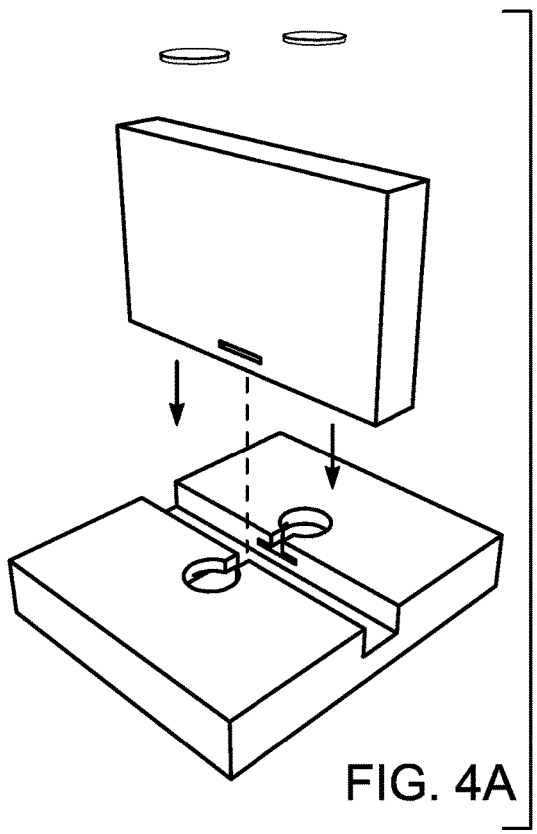
FIGS. 4A-4D are perspective views showing the method of assembly, from disassembled to assembled, respectively.
Figure 4B:
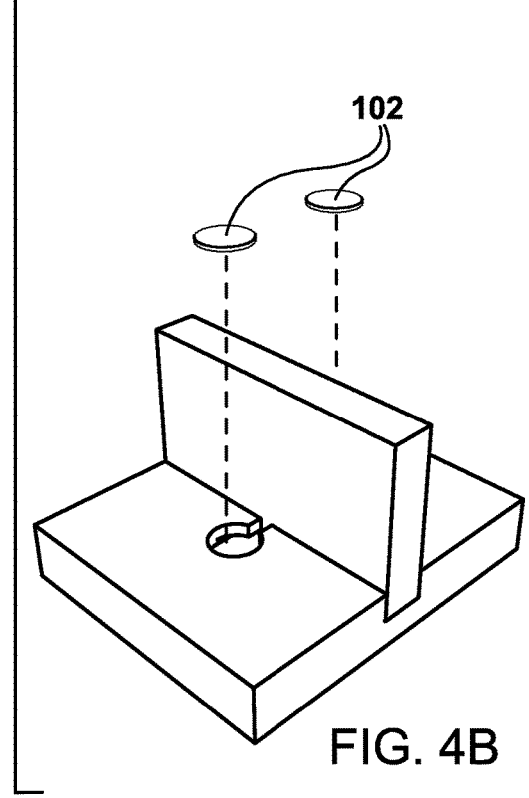
Figure 4C:
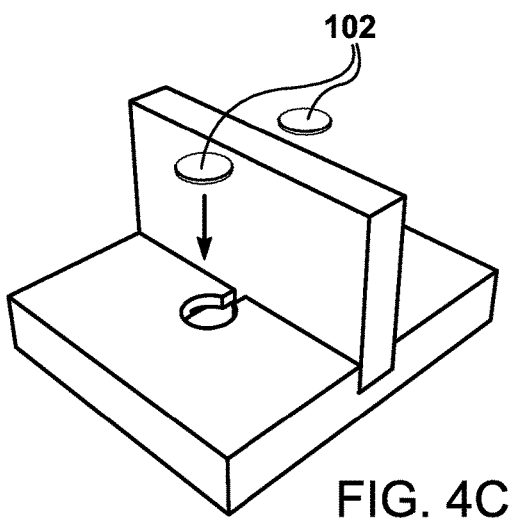
Figure 4D:
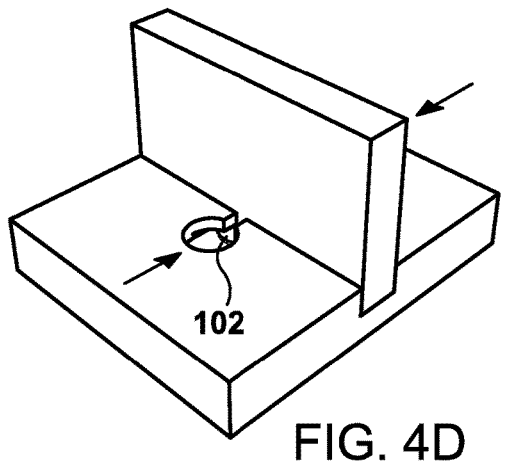
Figure 5A:
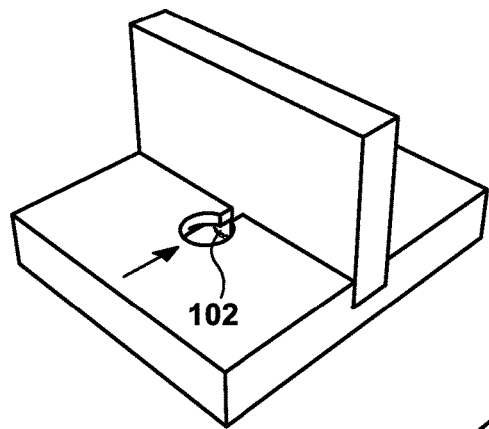
FIGS. 5A-5D are perspective views showing the method of disassembly, featuring use of the push-tool to move the nickel.
Figure 5B:
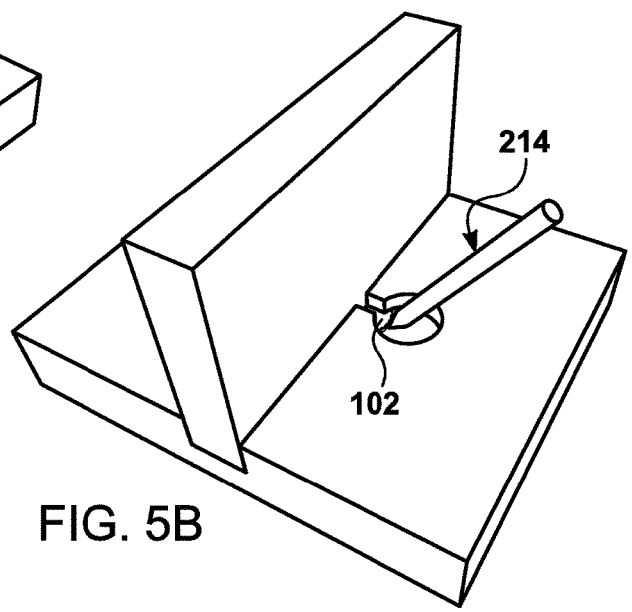
Figure 5C:
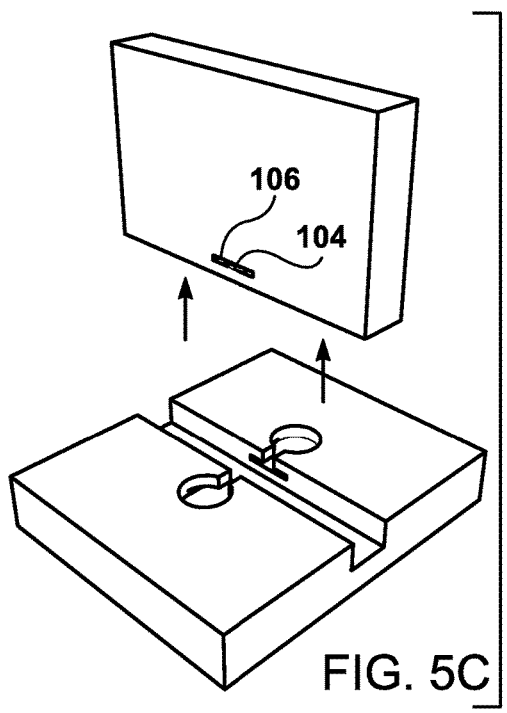
Figure 5D:
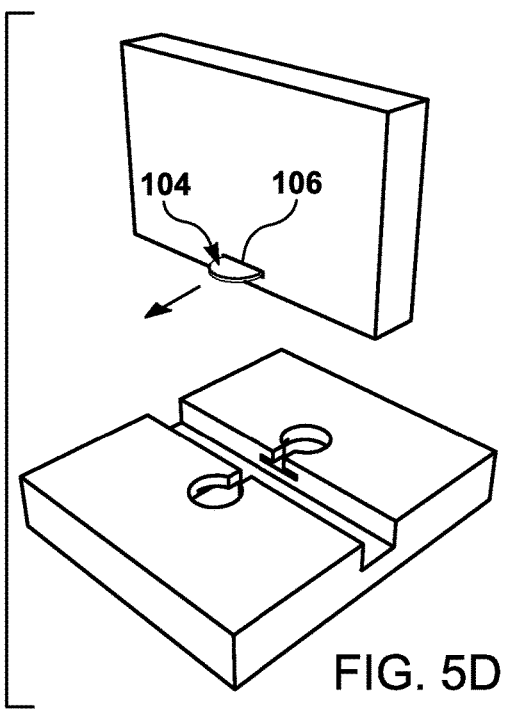
Figure 6A:
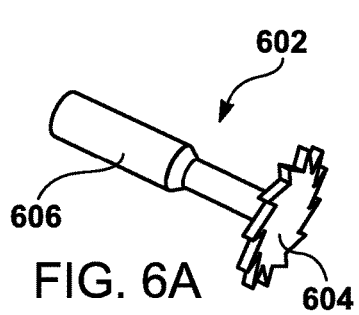
FIGS. 6A-6D are perspective views showing the specialized milling tool (and bit therefor) at work, milling the tool raceway and the coin-well.
Figure 6B:
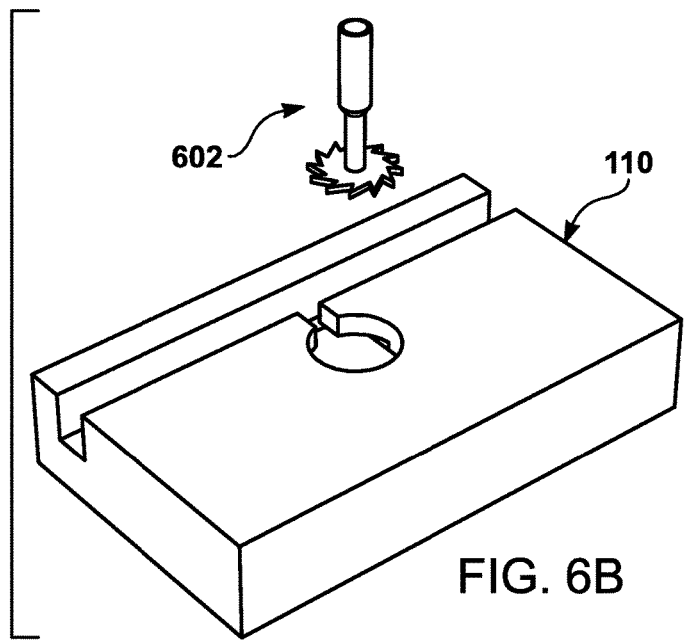
Figure 6C:
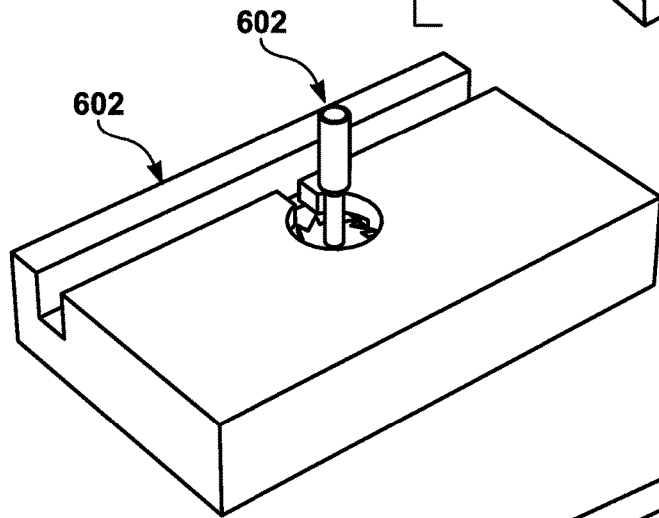
Figure 6D:
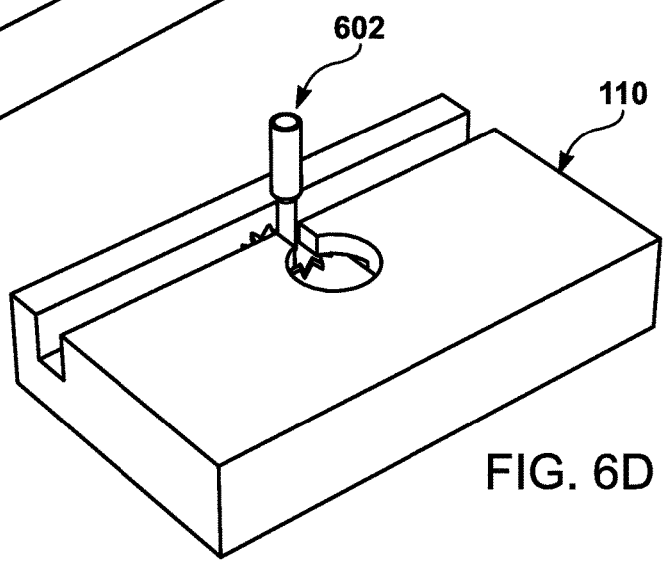
Figure 7A:
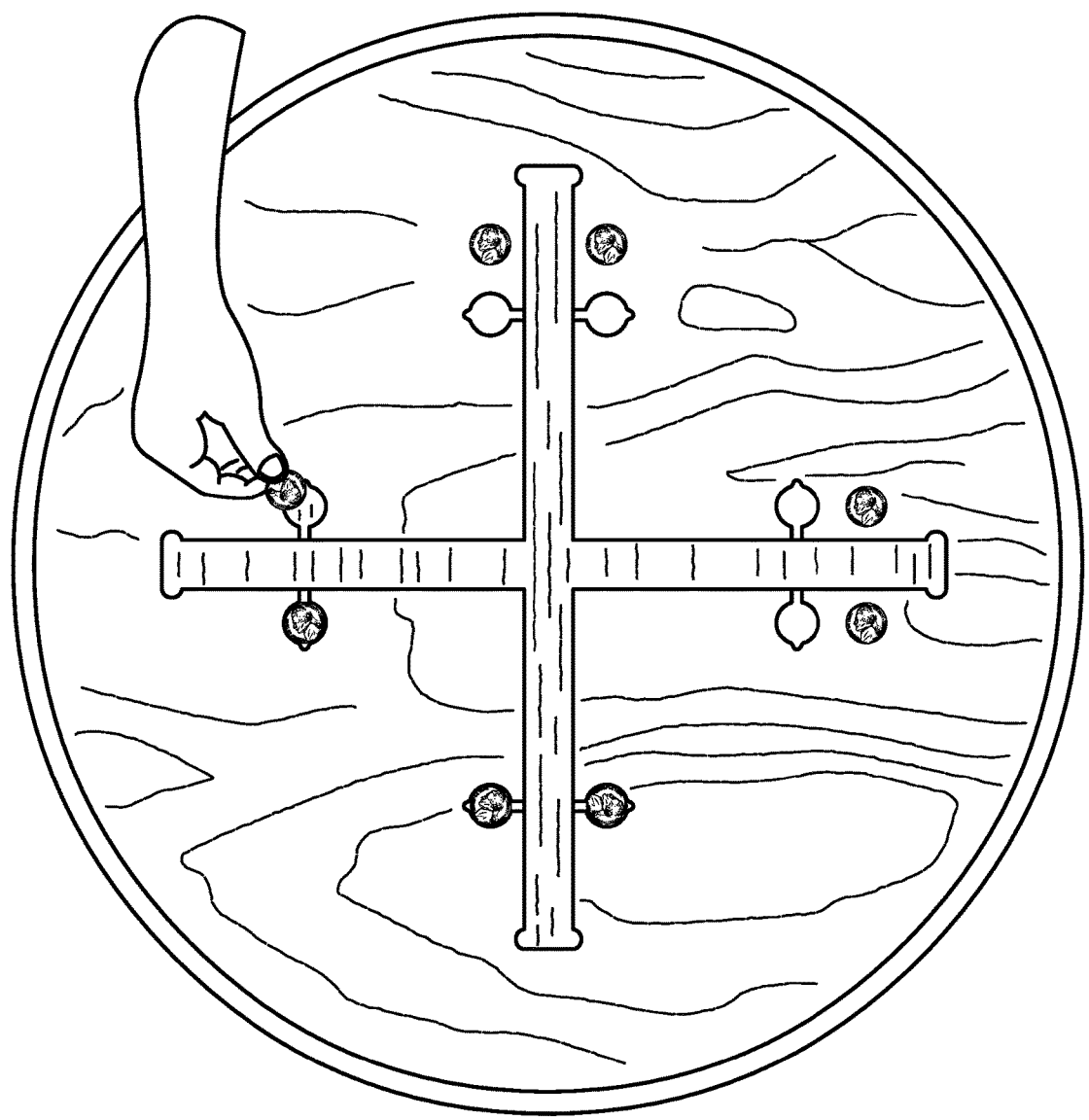
FIGS. 7A-7D are perspective views of the invention embodied as an apparatus device, to wit, a table comprising said joint(s) fastened via the instant herein-disclosed method.
Figure 7B:
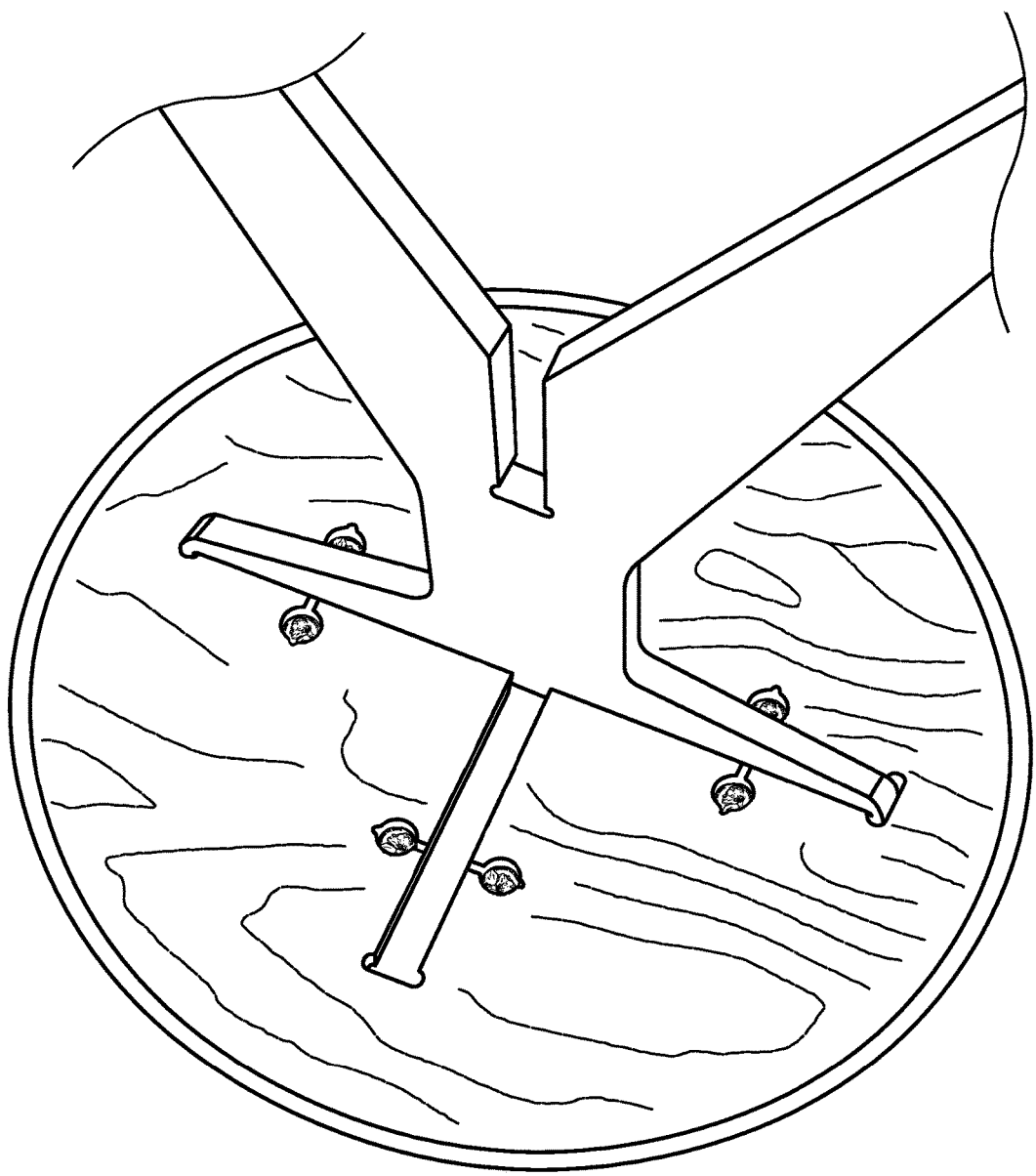
Figure 7C:
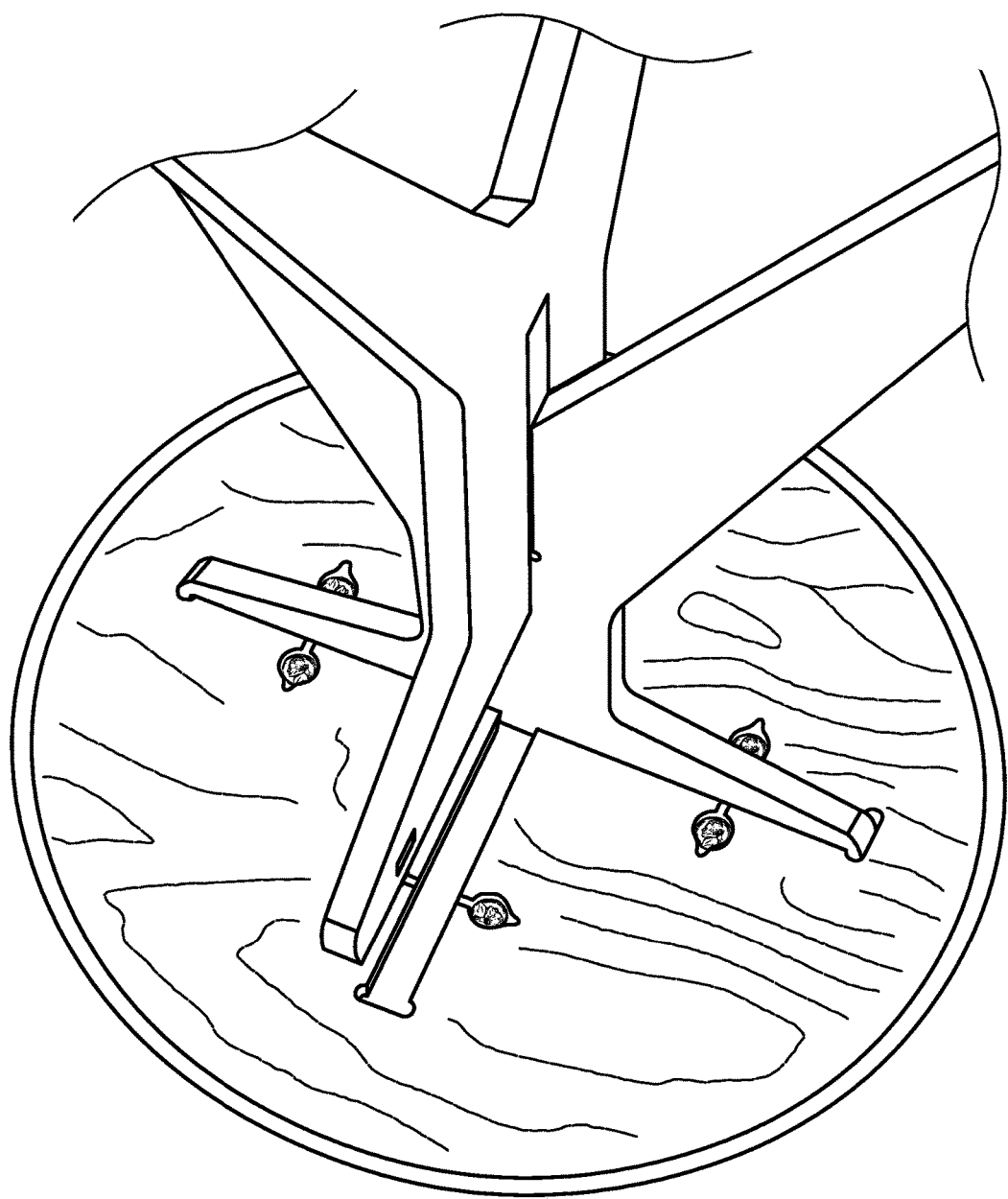
Figure 7D:
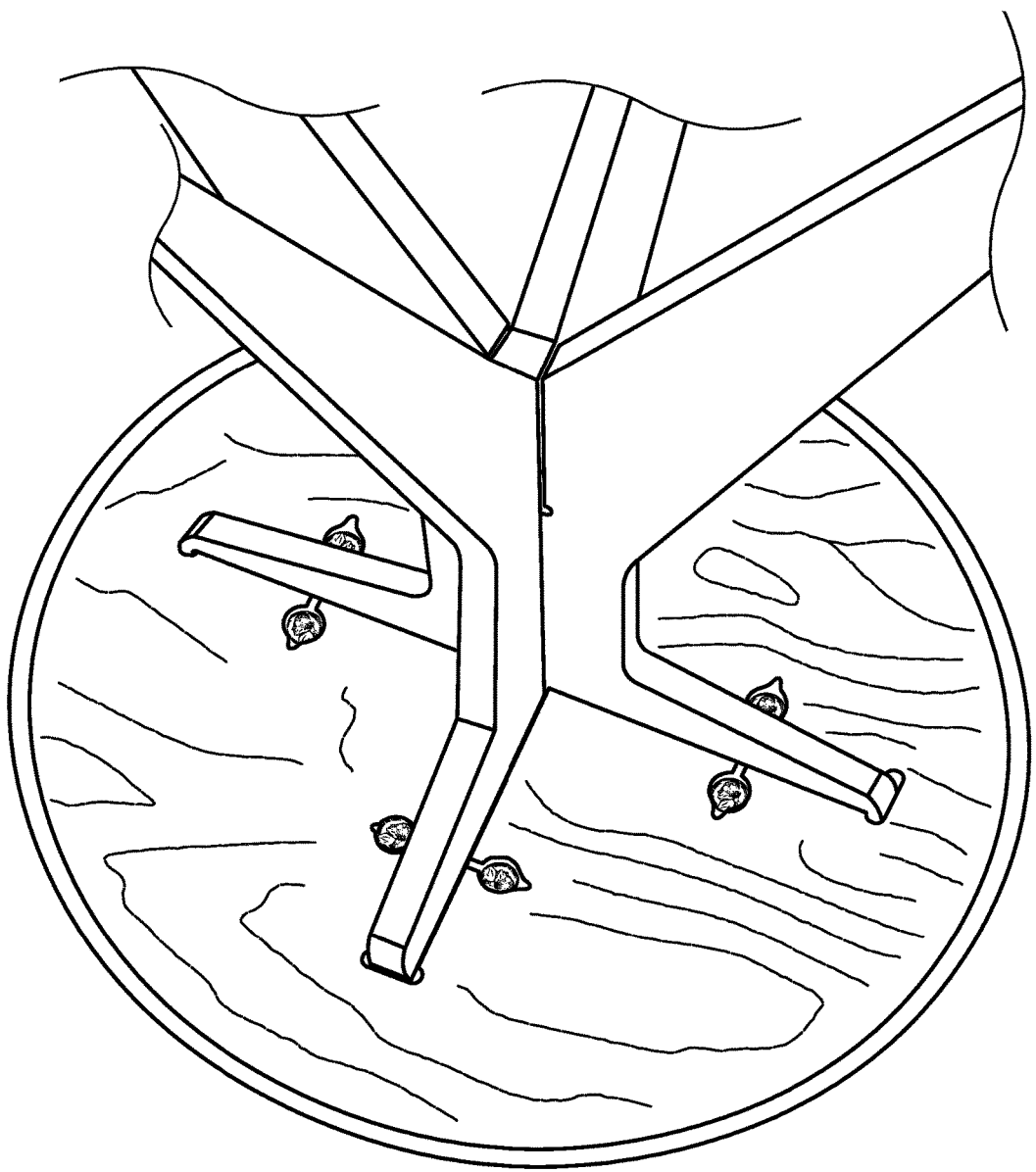

Push Tool Entry Notch (as featured in FIGS. 3A and 3B): the optional 'extra hole/depression' [in preferred embodiment per FIG. 3] on the distal end of each coin-well, wherein the user places her push-tool to access [push] the nickel. This is the [additional] point where the user can dig his/her tool into the wood to "get to" the nickel (in addition to the usual offset). The notch isn't absolutely necessary, as a thin push-tool can be manipulated within the coin-well to access a coin (given the offsets). *Note: offset in preferred embodiment is—+0.0075"

Push Tool Notch Length: Diameter of said notch 820 is entirely discretionary; in manufacture, one uses the same bit as used for the push tool raceway to mill this notch.

Male Part Groove Depth 804: how deep the bottom of the groove for the male part should be cut. Must be smaller than female part thickness—no-break-distance, which puts a lower limit on female part thickness.

Raceway Overhang: 814: minimum length for the part of the assembly next to the push tool raceway that hangs over the coin raceway, and holds the coin in place when the joint is fully assembled. This "overhang" should be strong enough to hold the entire furniture underneath (and/or around) the joint, as must be the overhang thickness 812.

Male Part Slot Distance 904: distance from the edge of the male part to the closest edge of the coin acceptance slot (aka slot in male part).

Male Part Slot Length 908: minimum length of the coin acceptance slot in the male part. This length can be somewhat larger without causing the assembly to fail.

Male Part Thickness 906: The depth of the male part of the joint; the wood panel which fits into the female piece's central groove.

Woodruff Keyseat Cutter: a brand of tooling, now a generic industry-wide term for said tool, to wit, a specialized router bit, aka a slot cutter bit, herein machined to the specifications enumerated supra and infra to an unusual size and shape, to mill the grooves and slots to create the enclosed invention.

DETAILED DESCRIPTION

The invention is a unique modification of biscuit joinery. The instant invention creates two-way slots, allowing a shelf joint to be fastened with a common nickel (or similar coin or disc). Rather than using a limited biscuit cutter/biscuit joiner, the instant method discloses use of a router with a specialized router bit (aka slot cutter bit); the slot cutter on the router [when the bit is machined in the following way infra, and then configured and used in the following way infra] allows a common U.S. 5¢ piece to become the spline/plate/biscuit joining the two wood pieces/panels, thereby allowing rapid assembly & disassembly of wood furniture.

Method of manufacture features an angled blade which is spring-loaded into a standard saw-blade, which jets out and cuts a slot into a wood panel/piece so a biscuit will fit into one or both sides (depending on what's being joined). The biscuit may be optionally further glued.

The angle of the cut is paramount: Usually the angle is 90°, but one may cut miters together. The depth of the cut must be precise for the instant "nickel biscuit" method to work, since the nickel biscuit will not expand like wood, and it will not "fix itself" via adjustment as with wedge-shaped wood biscuit.

The following is therefore the preferred method for manufacture of tooling and for milling of required slots so as to ultimately use nickels as biscuit fasteners:

Method of Manufacturing the Milling Tool
(Producing the Tool that Mills the Fastening Slots)
*Note: The following specifications assume the disc used is a common U.S. Nickel, diameter of about 0.832" and thickness of about 0.074". Same relative proportions may be used, however, so any appropriate disc or structurally proper plate biscuit may be used.

1. Take an existing Woodruff Keyseat Cutter 602" or similar cutting tool, that is slightly larger [about 0.013" larger] than the diameter and thickness of a nickel, as described infra;

2. Machine said "Woodruff Keyseat Cutter" by cutting the disc 604 down to just slightly larger than a nickel as follows:

2a. Machine the Woodruff Keyseat cutter disc 604 to a diameter of 0.845" and to a thickness of 0.078". The diameter of the cutter will therefore be 0.013" larger than a nickel and the thickness of the cutter will be 0.004" thicker than a nickel.

Note: other acceptable coins or disks require similar offsets. Ideally, the tool diameter should be about 1.56% larger than the coin, and the tool thickness should be about 5.40% thicker than the coin. These proportions should make the enclosed fastening method work for any customary furniture joint size.

3. The neck/shaft 606 of the Woodruff Keyseat cutter must also be machined down. For the "nickel-sized" slot cutter, the original shaft is 0.5" diameter. Machine the neck of this shaft 606 to a diameter of 0.25" (roughly a third (30.01%) of the diameter of a nickel).

This resulting 0.25" diameter neck 606 will then clear the "push tool raceway" 116 (said raceway 116 is milled with a standard 0.25" diameter end tool). (*"Raceway" 116 and Coin Well Raceway 816 and "Female [coin] Slot" are often used interchangeably, as the slot is naturally the end-resting position and a natural exit-position for the coin along its 'raceway' 116).

Method of Milling the Woodpanels:

The following specifications assume the disc used is a common nickel, diameter of about 0.832" and thickness of about 0.074"

A. The Female "Receiving" Wood Piece:

1. Cut the "female" component's central groove 804 to a depth approximately half the thickness of the material (herein plywood in preferred embodiment). The width of the groove 806 should, of course, match the thickness of the male part 906, plus a small offset (+0.0075" in preferred embodiment).

2. At the joint point, cut the "tool raceway" 816 across (perpendicular) to the central groove 806, from the groove 806 to the end of the coin-well 810. The raceway 816 total distance is typically the coin diameter+an additional ⅓ the coin-disc-fastener diameter (so in the preferred embodiment this measurement is about 1.109"). The raceway depth shall be cut at a depth (from the surface) about ½ the depth of the male part groove (at the approximate midpoint into the wood). In the usual case, the groove will be perpendicular to the male part groove, but it could be angled and still function.

3. Cut two symmetrical mirror image "coin wells" 108 to the diameter of the coin plus a small offset (+0.0075"), at the same depth as the tool raceway 116. The wells 108 are circular, and positioned approximately 0.138" from the central groove (=approximately ⅙ the coin's diameter away from the male central groove in the case of a Nickel). Then cut the fastener slot (raceway 116) using the following method:

4. Cut the "fastener slot" using the special router bit described supra.

5. Plunge the bit into one of the coin wells;

6. Move the bit toward the other coin well along the tool raceway, and raise the bit when it comes to the second coin well. (This movement cuts a strip out of the middle of the Female Part, crossing the Male Part Groove, such that a coin of the appropriate size can slide along it without falling out).

B. Milling the Center Joint (The Male Woodpiece)

1. On this piece, cut the "fastener receiver slot 902-908", the length of the diameter of the coin plus a small offset (+−0.0075") and the width of the thickness of the coin plus a small offset (+0.0075").

2. The fastener receiver slot 902-908 is placed near the wood piece's edge (the piece to be joined), a distance in from the proximal edge corresponding to the depth of the top of the fastener slot 116 in the Female Part. The center of the slot should therefore match up with the center of the Female Part's tool raceway 116 (groove for coin-pushing tool).

As to the shape of the wood pieces to be joined, the preferred embodiment (shown in FIGS. 1A through 2B) features a basic half-lap joint. Cross lap joints are also available for middle pieces, wherein both pieces of wood continue beyond the joint, as shown in FIGS. 3A and 3B. In addition, any appropriate joint that utilizes the herein-disclosed nickel-biscuit method may be used (e.g. bevel cut scarf joints, miter-cut scarf joints, tabled lap joints, finger and tab joints, shelf-housing joints, etc). The nickel biscuit method (and resulting apparatus furniture joint) works for all these joint varieties.

Preferred Embodiment Measurements

In a 1" thick plywood joint (wherein both wood pieces are 1" thick plywood), the following parameters are preferred:

Diameter of coin: 0.834"

Thickness of coin: 0.074"

Width of push tool raceway (must be at least the diameter of the modified Woodruff's Keyseat cutter's neck/shaft, and it should be approximately 0.255"

Allowance to let moving parts of the assembly pass/slide by each other: (aka 'the offset') is 0.0075"

Thickness of material required so as not to break under normal stress: 0.2"

Length of the shortest part of raceway (the overhang): should be between ⅓ and ¼ of the coin's diameter, or 0.25" (=total distance of overhang from central groove to coin-well).

Depth of coin-well (and raceway): this plane is at (below surface): NobreakDistance+coin_thickness+offset.

Diameter of coin well: coin diameter+offset.

Distance from edge of male part groove to center of coin-well: coin diameter/2+overhang.

Length from edge of coin well to end of notch: this is not important, but for ease should be raceway width/2.

Height of slot: coin-well depth+no-break-distance.

Central groove in male wood part: male part thickness+offset.

Raceway overhang thickness: no break distance.

Distance from edge of male part to closest edge of coin acceptance slot: no break distance.

Width of coin acceptance slot [in male wood piece]: coin-thickness+offset.

Min length of the coin acceptance slot in male part: coin-diameter+offset (this part may be a bit bigger without furniture fastening failure).

Method of Furniture Assembly

If only one nickel/coin/disc 102 is fastened, the user positions the male piece 104 into the central groove 112 of the female piece 110, then drops the coin 102 into either of the two coin wells 108, then uses her tool 214 to push the nickel 102 along the raceway 116 into the male central slot 106. The nickel 102 should not be pushed fully into the slot 106 (namely, some of the coin should still remain under the female piece's 110 raceway overhang 218). If the coin mistakenly goes completely inside the male part's slot 106 and only one coin is used, the fastener will no longer be able to join the male 104 and female 110 parts, as the coin 102 would then be wholly concealed in the male slot 106). Two nickels/discs would solve the above problem, and the two-coin fastening method works with the herein-disclosed invention.

Method of Furniture Disassembly

If only one nickel/coin/disc 102 is fastened, the user pushes the nickel 102 along the raceway 116 until it is fully inside the male wood piece 104 (inside the slot 106), then lifts the male piece 104 away from the female piece 110, and then "shakes" or otherwise drops the nickel 102 out of the male piece 104.

The "Single-Coin" Embodiment

If only one nickel/coin/disc is to be used as a fastener (FIGS. 1A-2B), there are three significant differences in manufacture, component design, method and assembly, while discussed infra and supra, may be emphasized as follows:

i. for the size/location of the male member slot 110, it is half the size of the male member 104, and cut a distance from the edge of the wood equal to the width of the slot;

ii. the male member 104 gets a dado on the side opposite to its coin slot, to fit into the thinner slot in the female member 110 and produce a corner joint without overhang;

iii. manufacture-method (slot-cutting) is tailored to the 'single coin' fastening apparatus-&-method, in that the modified-cutter is inserted into the singular coin slot 108 and moved through the raceway towards the male member groove, far enough that at least half the cutter's diameter extends into the male member groove, cutting the coin slot and creating the overhang. Next, the cutter it is moved back along the same path to the position of the singular coin well, from whence it is raised back upwards.

Alternative Embodiments

A table wherein at least one table leg is fastened to the bottom side of the table-top via one or more coin-shaped plate biscuits, wherein at least one coinwell and at least one slot are milled into the bottom side of the tabletop such that a coin may be placed in the coinwell, then slid along an adjacent coin-raceway into a coin-sized slot in the table leg, such that the coin straddles the leg and the table by being simultaneously positioned in both the leg slot and the raceway, wherein said raceway has a sufficient overhang of at least ten per cent of the tabletop's thickness, such that the coin holds the table together even if said table is lifted by its top.

Regarding Specifications & Disclosure

In the Summary above/below and in the Detailed Description above/below, and the Claims below, and in the accompanying drawings and appendices, reference is made to particular features (including method steps) of the invention. The disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and Cut also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limit is the second number. For example, 25 to 100 mm means a range whose lower limit is 25 mm and upper limit is 100 mm.

Aspects of the disclosed invention may be embodied as a system, method or process, or computer program product. Accordingly, aspects of the disclosed invention may take the form of an entirely different field and still hold for the herein-disclosed invention (i.e. a system for woodcutting may be applied in the field of toys, boats, or even laser-cutting of plastics or metals).

Any element in a claim that does not explicitly state "means for" performing a specified function, or "step for" performing a specific function is not to be interpreted as a "means" or "step" clause as specified in 35. U.S.C. §112 ¶ 6. Specifically, the use of "step of" in the claims herein is not intended to invoke the provisions of U.S.C. §112 ¶6.

Therefore, the Method Infra is Also:

A method of assembling a furniture joint, comprising a first piece of wood comprising a central groove running across a first axis along the length of the woodpiece's face, said groove milled to a depth of about half the first woodpiece's thickness; and two coinwells positioned on a second axis on the woodpiece's face, said second axis being perpendicular to said groove, wherein said coinwells are connected by a tool-raceway, said raceway likewise running along the second axis (perpendicular to said groove); wherein said coinwells are substantially mirror images of each other, and wherein said coinwells and said raceway are positioned about half as deep in the first woodpiece as is its central groove; and wherein the coinwells are accessible from the central groove via a raceway slot, said slot being substantially covered by a raceway overhang; said method further comprising a second woodpiece whose edge thickness is nominally smaller than the width of the first woodpiece's central groove, such that said the second wood piece's entire edge fits into said groove; and said second woodpiece further comprising a central coin slot positioned at a height and position such that, when said second woodpiece is nestled into the central groove of said first wood piece, said central coin slot lies on the same plane-height as the plane-height of said first wood piece's raceway and at the same central position as said raceway slot, such that a coin may be placed into either of the coinwells and then subsequently pushed along said raceway to the point where the wood pieces meet, said coin thereby straddling the two woodpieces and resting partially under said raceway overhang, so that said coin then holds the wood-pieces together, said coin thereby functioning as a plate biscuit joiner.

OR AS

The instant method wherein the coin is any disc with sufficient strength and texture to fit in the coinwells and to slide along the raceway and the slot, and to hold said woodpieces together per said method.

OR AS

The instant method wherein overhang's thickness is between about 15% and about 30% of the first woodpiece's thickness.
OR AS
The instant method wherein the raceway overhang's thickness is about 20% of the first woodpiece's thickness.
OR AS
The instant method wherein depth of the tool raceway equals:
a. the overhang's thickness, plus
b. the coin's thickness, plus
c. an "offset" of between about 0.5% and 1.3% of the first woodpiece's thickness; and
wherein the second woodpiece's coin-slot is positioned at the same height as the raceway's depth.
OR AS
The instant method wherein depth of the raceway equals:
the overhang's thickness, plus
the coin's thickness, plus
an "offset" of about 0.75% of the first woodpiece's thickness; and
wherein the second woodpiece's coin slot is positioned at the same height as is the raceway's depth.
OR AS
The instant method wherein said slot and said groove are larger than the pieces that fit inside them by an "offset" amount, and
wherein the thickness of said overhang is the "no break distance," and wherein both woodpieces are 1" plywood having about 1" edges; and
wherein the coin has a diameter of about 0.834" and a thickness of about 0.074";
and wherein the first woodpiece's central groove is about 1.0075" wide, thereby being nominally wider than the male woodpiece's edge; and
wherein the diameter of each coinwell is about 0.8415"; and
wherein the tool raceway and the coinwells rest at a depth of 0.274"; and wherein the width of said raceway is about 0.255"; and
wherein the offset is about 0.0075"; and
wherein the 'no break-distance' is about 0.2" in height (wood thickness);
and wherein the length of the overhang is about 0.25" ; and
wherein the depth of said coinwell and said raceway is equal to the no-break-distance+the coin-thickness+the offset; and
where the diameter of the coinwells equal the coin diameter+ the offset.
OR AS
A method for milling slots in wood so a U.S. nickel 5¢ piece functions as a biscuit joiner, said nickel having a diameter of about 0.832" and a thickness of about 0.074",
said method comprising the following non-sequential steps:
machine a woodruff keyseat cutter tool's disc to a diameter of about 0.845" and a thickness of about 0.078";
machine said cutter's shank to a diameter of about 0.25";
Ensure the diameter of said cutter is therefore 0.013" larger than a nickel and that the thickness of said cutter is 0.004" thicker than a nickel;
provide a "male" wood piece-member and "female" wood piece-member to be joined as a joint;
across said female member's face, at a depth of about 7/16", mill a groove of width approximately 0.0075" greater than the thickness of the edge of said male member;
using an end mill router bit with a flat bottom, plunge-cut two substantially identical coin wells at depth of about 0.195";
said coinwells each having a proximal end facing the central groove and a distal end facing the wood's outer edge; and then
optionally cut entry-notches into the distal end of each coinwell; and
at a substantially-central fastening point along said central groove, cut a tool raceway perpendicular to said groove, the length of said raceway being about ⅓ the total diameter of a nickel; and
plunge the bit into one of the coinwells;
move the bit toward the other coin well along the tool raceway, raising the bit when it comes to the second coin well (said movement cutting out a strip from the middle of the Female Part, crossing the Male Part Groove, such that a coin of the appropriate size can slide along it without falling out);
on the Male Member (the center piece joint), cut the "fastener receiver slot" to a length same as the diameter of the coin plus a small offset (+0.0075") and the width of the thickness of the coin plus a small offset (+0.0075");
the "fastener receiver slot" is placed near the wood piece's edge (the piece to be joined), a distance in from the proximal edge corresponding to the depth of the top of the fastener slot in the Female Part;
the center of said receiver slot therefore matches up with the center of the Female Part's tool raceway (groove for coin-pushing tool).
OR AS
A furniture joint comprising at least a first and a second piece of wood, both woodpieces having at least one edge, wherein
a groove for said second woodpiece is milled into said first woodpiece such that
one edge of the second woodpiece is wholly fit into said groove;
and wherein
disc-style plate biscuits are positioned into disc-slots in both the first and second woodpieces,
said disc-slots lie on the same plane as one another, and wherein
said disc-slots are each covered by an overhang whose thickness is at least 10% of the first woodpiece's thickness.
OR AS
A furniture joint comprising at least a first and a second piece of wood, both woodpieces having at least one edge, wherein
a groove for said second woodpiece is milled into said first woodpiece such that
one edge of the second woodpiece is wholly fit into said groove;
and wherein
disc-style plate biscuits are positioned into disc-slots in both the first and second woodpieces,
said disc-slots lie on the same plane as one another, and wherein
said disc-slots are each covered by an overhang whose thickness is between about 15% to about 25% of the thickness of the first woodpiece.
OR AS
A furniture joint comprising at least a first and a second piece of wood, said woodpieces each having at least one edge, wherein
a substantially central groove is milled into said first woodpiece such that
one whole edge of the second woodpiece is fit into said groove;

and wherein
   a disc-shaped plate biscuit is partially positioned into a slot milled into said first woodpiece, said slot being substantially covered by an overhang whose thickness is between about 15% to about 25% of the thickness of said first woodpiece, and wherein
   said disc-shaped plate biscuit is simultaneously partially positioned into a slot milled into said second woodpiece, said slot resting at same height as the first woodpiece's slot, so that the plate biscuit straddles both woodpieces, allowing said overhang to hold said first woodpiece fixed to said second woodpiece using the disc as a joiner.
OR AS
A method of assembling a furniture joint, comprising;
a first piece of wood comprising a central groove running across a first axis along the length of the woodpiece's face, said groove milled to a depth of about half the first woodpiece's thickness; and
a coinwell positioned on a second axis on the woodpiece's face, said second axis being perpendicular to said groove,
wherein said coinwell is connected to said groove by a tool-raceway, said tool-raceway likewise running along said second axis; and
wherein the coinwell and the tool raceway are positioned about half as deep in the first woodpiece as is its central groove; and
wherein the coinwell is accessible from the central groove via a substantially central raceway slot, said slot being substantially covered by a raceway overhang; and said method further comprising
a second woodpiece whose edge thickness is nominally smaller than the width of the first woodpiece's central groove, such that said the second wood piece's entire edge fits into said groove; and wherein
said second woodpiece further comprises a central coin slot positioned at a height and central position such that, when said second woodpiece is nestled into the central groove of said first wood piece, said central coin slot lies on the same plane-height as the height of said first wood piece's raceway and at the same central position as said raceway slot, such that a coin may be placed into the coinwell and then subsequently pushed along said raceway to the point where the wood pieces meet, said coin thereby straddling the two woodpieces and resting partially under said raceway overhang, so that said coin then holds the woodpieces together, said coin thereby functioning as a plate biscuit joiner.
OR AS
The instant method wherein the coin is any disc with sufficient strength and texture to fit in the coinwell raceway and slot, and to hold said woodpieces together per said method.
OR AS
The instant method of wherein overhang's thickness is between about 15% and about 30% of the first woodpiece's thickness.
OR AS
The instant method wherein the raceway overhang's thickness is about 20% of the first woodpiece's thickness.
OR AS
The instant method wherein depth of the tool raceway equals:
   the overhang's thickness, plus
   the coin's thickness, plus
   an "offset" of between about 0.5% and 1.3% of the first woodpiece's thickness; and
   wherein the second woodpiece's coin slot is positioned at the same height as the raceway's depth.
OR AS
The instant method wherein depth of the tool raceway equals:
   the overhang's thickness, plus
   the coin's thickness, plus
   an "offset" of about 0.75% of the first woodpiece's thickness; and
   wherein the second woodpiece's coinslot is positioned at the same height as is the raceway's depth.
OR AS
The instant method wherein said slot and said groove are larger than the pieces that fit inside them by an "offset" amount, and
   wherein the thickness of said overhang is the "no break distance," and wherein both woodpieces are 1" plywood having about 1" edges; and
   wherein the coin has a diameter of about 0.834" and a thickness of about 0.074";
   and wherein the first woodpiece's central groove is about 1.0075" wide, thereby being nominally wider than the male woodpiece's edge; and
   wherein the diameter of each coinwell is about 0.8415"; and
   wherein the tool raceway and the coinwells rest at a depth of 0.274"; and wherein the
   width of said raceway is about 0.255"; and
   wherein the offset is about 0.0075"; and
   wherein the 'no break-distance' is about 0.2" in height (i.e. 0.2" of wood-thickness);
   and wherein the length of the overhang is about 0.25"; and
   wherein the depth of said coinwell and said raceway is equal to the no-break-distance+the coin-thickness+the offset; and
   where the diameter of the coinwells equal the coin diameter+ the offset.
OR AS
A method for milling slots in wood so a U.S. nickel (5¢ piece) functions as a biscuit joiner, said nickel having a diameter of about 0.832" and a thickness of about 0.074", said method comprising the following non-sequential steps:
   machine a woodruff keyseat cutter tool's disc to a diameter of about 0.845" and a thickness of about 0.078";
   machine said cutter's shank to a diameter of about 0.25";
   ensure the diameter of said cutter is therefore 0.013" larger than a nickel and that the thickness of said cutter is 0.004" thicker than a nickel;
   provide a "male" wood piece-member and "female" wood piece-member to be joined as a joint;
   across said female member's face, at a depth of about 7/16", mill a groove of width approximately 0.0075" greater than the thickness of the edge of said male member;
   using an end mill router bit with a flat bottom, plunge-cut a coin well at depth of about 0.195"; said coinwell having a proximal end facing the central groove and a distal end facing the wood's outer edge; and then
   optionally cut an entry-notch into the distal end of the coinwell; and
   at a substantially-central fastening point along said central groove, cut a tool raceway perpendicular to said groove, the length of said raceway being about 1/3 the total diameter of a nickel; and
   plunge the bit into one of the coinwells;
   move the bit toward the other coin well along the tool raceway, raising the bit when it comes to the second coin well (said movement cutting out a strip from the middle of the Female Part, crossing the Male Part Groove, such that a coin of the appropriate size can slide along it without falling out);

on the Male Member (the center piece joint), cut the "fastener receiver slot" to a length same as the diameter of the coin plus a small offset (+0.0075") and the width of the thickness of the coin plus a small offset (+0.0075");

the "fastener receiver slot" is placed near the wood piece's edge (the piece to be joined), a distance in from the proximal edge corresponding to the depth of the top of the fastener slot in the Female Part;

the center of said receiver slot therefore matches up with the center of the Female Part's tool raceway (groove for coin-pushing-tool).

What is claimed is:

1. A method of assembling a furniture joint, comprising;
   a first piece of wood comprising a central groove located along a longitudinal first axis of the first piece, said central groove milled to a depth of about half the thickness of the first piece; and
   two coinwells positioned on a second axis on a face of the first piece, said second axis being perpendicular to said central groove,
   wherein said coinwells are connected by a tool-raceway, said tool-raceway located along the second axis;
   wherein said coinwells are substantially mirror images of each other, and
   wherein said coinwells and said tool-raceway are of a thickness that is about half the thickness of the central groove; and
   wherein the coinwells are accessible from the central groove via a raceway slot, said raceway slot being substantially covered by a raceway overhang;
   said method further comprising a second piece of wood having an edge having a thickness that is smaller than the width of the central groove of the first piece, such that the edge of the second piece fits into said central groove; and
   said second piece further comprising a central coin slot positioned at a height and position such that, when said edge of the second piece is inserted into the central groove of said first piece, said central coin slot is aligned with the raceway slot of each coinwell
   inserting a coin into either of the coinwells and pushing the coin along said raceway slot and into the central coin slot, said coin thereby straddling the first and second pieces and located partially under said raceway overhang, so that said coin joins the first and second pieces.

2. The method of claim 1 wherein the coin is any disc with sufficient strength and texture to fit in the coinwells and to slide along the raceway slot and the central coin slot, and to hold said first and second pieces together.

3. The method of claim 1, wherein the raceway overhang is of a thickness between about 15% and about 30% of the thickness of the first piece.

4. The method of claim 1, wherein the raceway overhang is of a thickness that is about 20% of the thickness of the first piece.

5. The method of claim 1, wherein a depth of the tool-raceway is calculated using the following formula:

$$D_{TR}=T_{RO}+T_C+O$$

wherein $D_{TR}$ is the depth of the tool-raceway, $T_{RO}$ is the thickness of the raceway overhang, $T_C$ is the thickness of the coin, and O is an offset of 0.5% to 1.3% of the thickness of the first piece.

6. The method of claim 1, wherein a depth of the raceway slot is calculated using the following formula:

$$D_{RS}=T_{RO}+T_C+O$$

wherein $D_{RS}$ is the depth of the raceway slot, $T_{RO}$ is the thickness of the raceway overhang, $T_C$ is the thickness of the coin, and O is an offset of about 0.75% of the thickness of the first piece.

7. The method of claim 1,
   wherein the first and second wood pieces are formed from 1" plywood having edges of about 1", wherein the raceway slot and the central coin slot have a width of about 0.255",
   wherein the raceway overhang has thickness of 0.2" which is the "no break" thickness of the joint formed between the first and second pieces and a the raceway overhang is of a length of about 0.25",
   wherein the central groove is of a width about 1.0075",
   wherein the diameter of each coinwell is about 0.8415",
   wherein the tool-raceway and the coinwells are of depth of about 0.274",
   wherein the raceway slot, central coin slot, and central are larger than the coin by an offset of at least 0.0075",
   wherein the coin is of a diameter of about 0.834"and of a thickness of about 0.074",
   wherein the depth of the coinwells are calculated using the following formula:

$$D_{CW}=T_{NB}+T_C+O$$

wherein $D_{CW}$ is the depth of the coinwells, $T_{NB}$ is the "no break" thickness, $T_C$ is the thickness of the coin, and O is the offset, and
   wherein the diameter of the coinwells are calculated using the following formula:

$$\varnothing_{CW}=\varnothing_C+O$$

wherein $\varnothing_{CW}$ is the diameter of the coinwell, $\varnothing_C$ is the diameter of the coin, and O is the offset.

8. A method of assembling a furniture joint, comprising;
   a first piece of wood comprising a central groove located along a longitudinal first axis of the first piece, said central groove milled to a depth of about half the thickness of the first piece; and
   a coinwell positioned on a second axis on a face of the first piece, said second axis being perpendicular to said central groove, wherein said coinwell is connected to said groove by a tool-raceway, located along said second axis; and
   wherein the coinwell and the tool-raceway of a thickness that is about half the thickness of the central groove; and
   wherein the coinwell is accessible from the central groove via a raceway slot, said raceway slot being substantially covered by a raceway overhang; and
   said method further comprising
   a second piece of wood having an edge thickness that is smaller than the width of the central groove of the first piece, such that the edge of the second piece fits into said central groove; and
   wherein said second piece further comprises a central coin slot positioned at a height and central position such that, when said end of the second piece is inserted into the central groove of said first piece, said central coin slot lies is aligned with the raceway slot of the coinwell,
   inserting a coin into the coinwell and pushing the coin along said raceway slot and into the central coin slot, said coin thereby straddling the first and second pieces and located partially under said raceway overhang, so that said coin joins the first and second pieces.

9. The method of claim 8, wherein the coin is any disc with sufficient strength and texture to fit in the coinwell raceway slot and the central coin slot, and to hold said first and second pieces together.

10. The method of claim 8, wherein the raceway overhang is of a thickness between about 15% and about 30% of the thickness of the first piece.

11. The method of claim 8, wherein the raceway overhang is of a thickness that is about 20% of the thickness of the first piece.

12. The method of claim 8, wherein a depth of the tool-raceway is calculated using the following formula:

$$D_{TR}=T_{RO}+T_C+O$$

wherein $D_{TR}$ is the depth of the tool-raceway, $T_{RO}$ is the thickness of the raceway overhang, $T_C$ is the thickness of the coin, and O is an offset of 0.5% to 1.3% of the thickness of the first piece.

13. The method of claim 8, wherein a depth of the raceway slot is calculated using the following formula:

$$D_{RS}=T_{RO}+T_C+O$$

wherein $D_{RS}$ is the depth of the raceway slot, $T_{RO}$ is the thickness of the raceway overhang, $T_C$ is the thickness of the coin, and O is an offset of about 0.75% of the thickness of the first piece.

14. The method of claim 8,
wherein the first and second wood pieces are formed from 1" plywood having edges of about 1", wherein the raceway slot and the central coin slot have a width of about 0.255",
wherein the raceway overhang has thickness of 0.2" which is the "no break" thickness of the joint formed between the first and second pieces and a the raceway overhang is of a length of about 0.25",
wherein the central groove is of a width about 1.0075",
wherein the diameter of the coinwell is about 0.8415",
wherein the tool-raceway and the coinwell are of depth of about 0.274",
wherein the raceway slot, central coin slot, and central are larger than the coin by an offset of at least 0.0075",
wherein the coin is of a diameter of about 0.834" and of a thickness of about 0.074",
wherein the depth of the coinwell is calculated using the following formula:

$$D_{CW}=T_{NB}+T_C+O$$

wherein $D_{CW}$ is the depth of the coinwell, $T_{NB}$ is the "no break" thickness, $T_C$ is the thickness of the coin, and O is the offset, and
wherein the diameter of the coinwell is calculated using the following formula:

$$\varnothing_{CW}=\varnothing_C+O$$

wherein $\varnothing_{CW}$ is the diameter of the coinwell, $\varnothing_C$ is the diameter of the coin, and O is the offset.

* * * * *